US005557965A

United States Patent [19]
Fiechtner

[11] Patent Number: 5,557,965
[45] Date of Patent: Sep. 24, 1996

[54] PIPELINE LEAK DETECTOR

[75] Inventor: Bradley T. Fiechtner, San Diego, Calif.

[73] Assignee: Dover Corporation, New York, N.Y.

[21] Appl. No.: 325,964

[22] Filed: Oct. 20, 1994

[51] Int. Cl.$^6$ ........................................... G01M 3/04
[52] U.S. Cl. ........................................ 73/49.2; 73/40.5 R
[58] Field of Search .............................. 73/40.5 R, 49.2

[56] References Cited

U.S. PATENT DOCUMENTS

| | | | |
|---|---|---|---|
| 3,039,295 | 6/1962 | Le Mat et al. | 73/49.2 |
| 3,304,546 | 2/1967 | Kern et al. | 340/242 |
| 3,793,876 | 2/1974 | Oswald | 73/46 |
| 3,939,383 | 2/1976 | Alm | 317/123 |
| 3,940,020 | 2/1976 | McCrory et al. | 222/52 |
| 3,978,709 | 9/1976 | Ando | 73/40.5 |
| 4,608,857 | 9/1986 | Mertens et al. | 73/40.5 R |
| 4,725,042 | 2/1988 | Mason | 251/315 |
| 4,811,252 | 3/1989 | Furuse | 364/556 |
| 4,827,762 | 5/1989 | Hasselmann | 73/49.2 |
| 4,835,717 | 5/1989 | Michel et al. | 364/558 |
| 4,852,054 | 7/1989 | Mastandrea | 364/509 |
| 5,046,519 | 9/1991 | Stenstrom et al. | 137/1 |
| 5,050,634 | 9/1991 | Fiechtner | 137/486 |
| 5,072,621 | 12/1991 | Hasselmann | 73/40.5 |
| 5,201,212 | 4/1993 | Williams | 73/40.5 R |
| 5,297,423 | 3/1994 | Keating et al. | 73/49.2 |
| 5,319,545 | 6/1994 | McGarvey et al. | 364/403 |
| 5,375,455 | 12/1994 | Maresca, Jr. et al. | 73/40.5 R |

OTHER PUBLICATIONS

"New Pressurized Line Leak Detection System" Advertisement in *The Journal of Petroleum Marketing*, Jun. 1994, p. 37.

Instructions and Operating Manual for Model TRS-76 "Leak Detector System" By Ronan, pp. 1, 2 & 8.

FD200PSRA Line Pressure Probe, By Mallory, Rev. Oct. 1990, pp. 1, 23 & 26.

Announcing The Campo/Miller Line Leak Detector For All Tests LS300-120 Plus, By Campo/Miller, Rev. Jul. 1991, pp. 1, 2 & 3.

Red Jacket Electronic Line and Sensor Monitoring, PPM4000, By Red Jacket Electronics, A Marley Pump Company, Nov. 1990, pp. 1–8.

U.S. Environmental Protection Agency, *Standard Test Procedures for Evaluating Leak Detection Methods: Pipeline Leak Detection Systems*, pp. i–xvi and 1–96, (1990).

Line Leak Detectors Determine Integrity by Variety of Methods, *Petroleum Marketer*, pp. 55–57 (1991).

Fiechtner, *Understanding Pipeline Leak Detection*, Modern Truck Stop News, pp. 14, 15 and 17 (Oct. 1993).

*Primary Examiner*—Hezron E. Williams
*Assistant Examiner*—Jay L. Politzer
*Attorney, Agent, or Firm*—Baker, Maxham, Jester & Meador

[57] ABSTRACT

An apparatus for detecting leaks in a pipeline in a liquid dispensing system. The apparatus generally includes a tank containing a liquid, a dispenser valve disposed remote from the tank, a pipeline connected between the storage tank and the dispenser valve, a pump at the tank for supplying liquid under pressure to the pipeline and an isolation valve between the pump and the dispenser valve to isolate the pump pressure from the pressure in the pipeline between the isolation valve and the dispenser valve. The apparatus further has a pressure sensor between the isolation valve and the dispenser valve for measuring any pressure change in the pipeline between the isolation valve and the dispenser value. A leak simulation valve alternatively may be provided for draining the pipeline to simulate a leak.

17 Claims, 5 Drawing Sheets

PIPELINE LEAK DETECTOR

BACKGROUND

1. Field of the Invention

The present invention relates generally to leak detection and pertains particularly to an improved method and apparatus for detecting very low leak rates.

2. Discussion of the Related Art

Concerns for protecting the environment from pollution has led to the development of leak detection systems particularly for underground storage tanks and pipelines. These conventional leak detection methods and systems employ what is known as the pressure decay method. These systems generally measure the time interval for the pressure in the pipeline to drop from an initial pressure, such as about 10 psi, to a final pressure of about 5 psi.

A typical example of the prior art is illustrated in FIG. 1. Typical fuel storage tank 10 is provided with pump 12 which is typically a submersible pump which supplies pressurized fuel or liquid from the storage tank via pipeline 14 to shut-off valve 16 and fuel nozzle 18 to fuel automobiles and the like. The typical system includes an internal poppet type check valve 22 at the pump which also includes a relief valve. The relief valve acts after the shutoff valve has been closed to relieve the normal pump pressure down to a line pressure of about 15 psi to maintain liquid in the pipeline. When the pump is turned off, the pressure in the pipeline is relieved to 13–15 psi by bleeding excess pressurized fluid back into the underground storage tank. This relief pressure is the starting pressure for the pressure decay systems.

The pressure decay system utilizes a pressure transducer 24 in the line between the pump and the cut-off valve to measure rate of drop in pressure from the 10 psi to 5 psi. A timer is initiated at 10 psi and the time is measured to when the final pressure has dropped to 5 psi, where the timer then stops. The time required for this pressure change is the basis for determining the leak rate. This system has a number of problems.

Among the problems of these prior art devices is that fuel in the underground storage tanks normally contains many small contaminants such as rust and particles of sand. These particles flow through the check valve during fuel dispensing by the station customers and frequently become trapped in the check valve sealing surface causing the check valve to leak. These contaminants in the fuel frequently cause the fluid to leak from the pipeline back into the underground storage tank resulting in a measured pressure drop in the system which will generate a false leak signal.

Another difficulty with the prior art systems is that they also use a relatively large pressure drop as the test interval. The large pressure change required can lead to difficulties in measuring the differences between an actual leak in the pipeline versus an apparent leak. An apparent leak can come from a source such as expansion or contraction in the pipeline due to compressibilities and the significantly larger thermal coefficient of trapped vapor as compared to the fluid. Since the test is also generally run below 13 psi, the effects of compressibility are greatly enhanced and the pressure versus volume relationship is not linear. This makes it very difficult to relate a pressure change to an actual fluid and volume change. This is due to the very large difference in compressibility of trapped vapor and/or flexible piping as compared to the fluid contained within the piping.

The pressure changes due to compressibility and thermal effects are an even greater problem with larger pipelines. A large pipeline is defined in the industry as a three (3) inch line of about 800 ft. in length. The prior art systems are generally ineffective in detecting leaks in these large systems.

One recently developed improved system is disclosed in prior U.S. Pat. No. 5,072,621 entitled PIPELINE LEAK DETECTOR APPARATUS AND METHOD. The system disclosed in that patent measures the flow rate around an in line shut off valve. However, that system does have some limitations that are obviated by the present system.

It is therefore desirable that a system and method for detecting leaks in pipeline be available which overcome the problems of the prior art.

SUMMARY OF THE INVENTION

It is the primary object of the present invention to provide an improved leak detection system that overcomes the problems of the prior art.

In accordance with a primary aspect of the present invention an apparatus for detecting leaks in a pipeline in a liquid dispensing system comprises a tank containing a liquid, dispenser valve means disposed remote from said tank, a pipeline connected between said storage tank and said dispenser valve means, a pump at the tank for supplying liquid under pressure to the pipeline, an isolation valve between the pump and the dispenser valve for maintaining maximum delivery pressure in the pipeline between the isolation valve and the dispenser valve, and pressure sensing means between the isolation valve and the dispenser valve for measuring any pressure change in the pipeline between the isolation valve and the dispenser or shut-off valve.

BRIEF DESCRIPTION OF THE DRAWING

The above and other objects and advantages of the present invention will become apparent from the following description when read in conjunction with the accompanying drawing wherein.

DETAILED DESCRIPTION OF THE PREFERRED EMBODIMENTS

Figure 1:
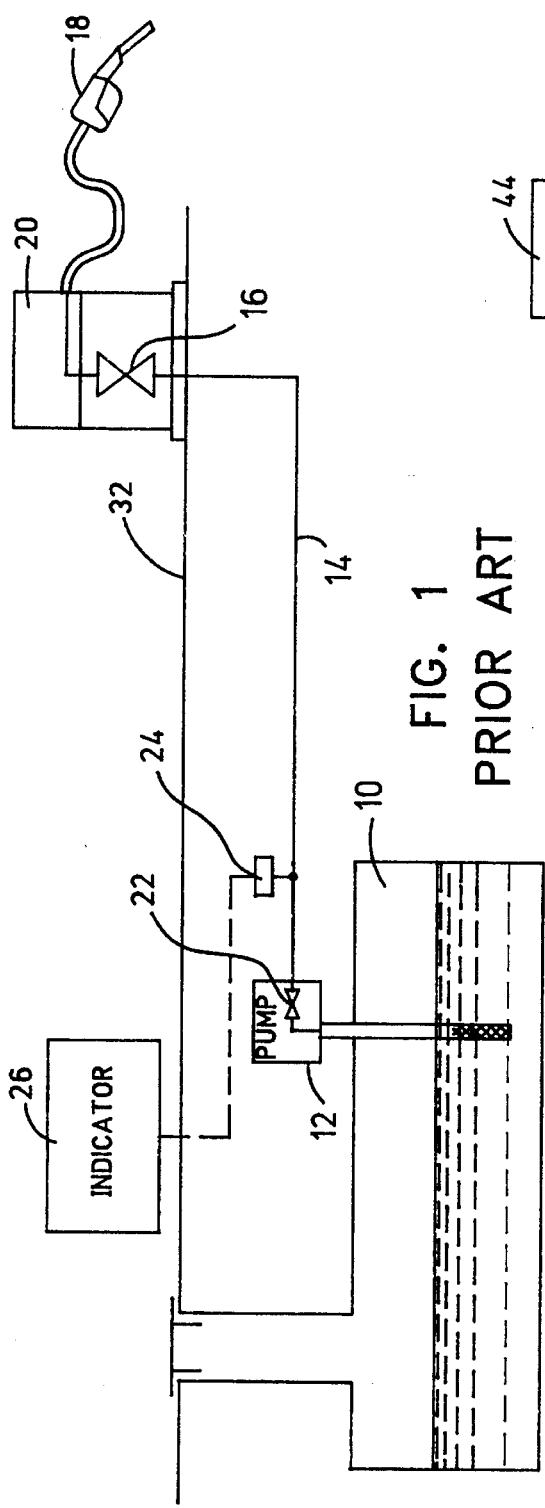
FIG. 1 is a schematic illustration of a typical prior art leak detection system.
Figure 2:
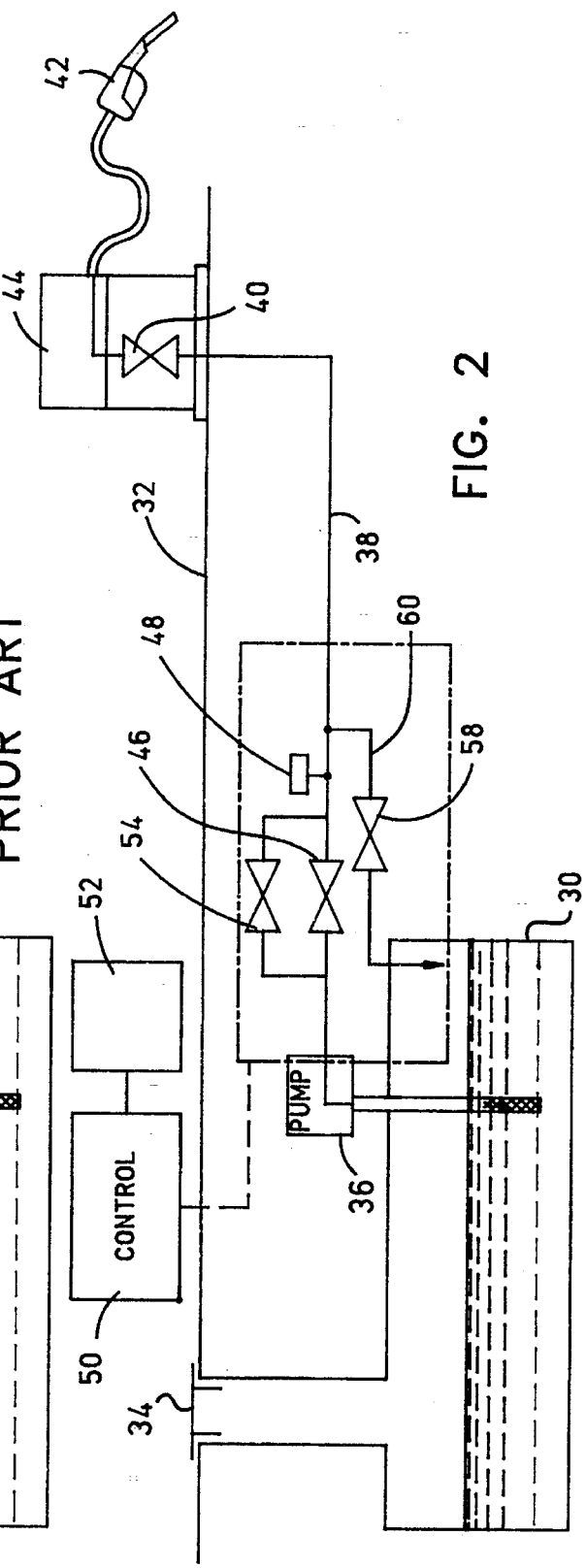
FIG. 2 is a schematic diagram illustrating an exemplary preferred embodiment of the present invention.

Referring now to the drawing, and particularly to FIG. 2, there is illustrated an exemplary embodiment of the present invention embodied in a typical automobile fueling system. As illustrated, gasoline storage tank 30 is buried beneath ground surface 32 with access via fill tube and cap 34 for filling the tank. Pump 36, which may be a submersible pump, is mounted on or within the tank and draws fuel from the tank and supplies or conveys it under pressure by way of a conduit or pipeline 38 to a dispensing assembly including dispensing or shut-off valve 40 and dispensing nozzle 42. The dispensing assembly is usually mounted on housing or stand 44 which also includes dispensing volume and price meters.

The present invention involves the placement of a combination of isolation valve 46 and a pressure sensing device or transducer 48 in pipeline 38 between pump 36 and shut-off valve 40. The isolation valve is a highly effective remotely operated valve, the details of which will be more fully described hereinafter. The isolation valve has a hardened wiper seal which, while sealing, wipes the valve seat in a manner to eliminate contaminants, such as grains of sand or the like, thereby insuring a positive seal. This valve is effective in maintaining a pressure near normal delivery pressure, which is typically higher than the pressure maintained by the existing system relief valve located inside the pump. This pressure is preferably within the linear range of the pressure versus volume curve of FIG. 3, which is above 15 psi and up to the maximum system delivery pressure. System operating pressures can be up to about 50 psi. Typical prior art systems operate at pressures of 5–10 psi which are located in the non-linear range of FIG. 3. By operating at a higher pressure (above 15 psi). in the neighborhood of at least 20 psi. many false signals such as those resulting from trapped compressed gas or elasticity within the pipeline can be eliminated or at least reduced. Therefore, it is preferred to operate the system above 20 psi.

The isolation valve and the pressure transducer are electrically connected to controller 50 which preferably includes a CPU or programmable computer chip with memory and the like for assembling, calculating and manipulating data and providing a suitable readout at digital readout panel 52. The system is capable of indicating to the operator the presence of any leak detected. The specific details of major components of this system are not believed necessary to illustrate as it is believed with the herein description and illustration and accompanying explanation, one of ordinary skill in the art would be able to assemble and operate this system.

The process of determining a leak involves operation of pump 36 to pressurize pipeline 38 and fill it with fluid. This leak detection process can be initiated by a customer dispensing fuel. As soon as suitable delivery pressure of at least 20 psi is reached isolation valve 46 may be closed and pump 36 may be shut down or remain on. Pressure transducer 48 is then activated or monitored to detect a change in the pressure within the pipeline over a short period of time. The transducer is responsive to a pressure change of as little as 0.1 psi which is detected and monitored. If the pressure change is an increase it may be assumed that it is due to heating of the liquid in the pipeline which may result from difference in temperature between the surrounding ground and the fuel in the pipeline. If the pressure change is a drop then it must be ascertained if this is the result of a leak or some other factor.

The system also preferably includes a modification made to provide means for controlling incremental pressure changes in the system during leak detection operation. This modification comprises pressure control valve 54 placed in a bypass line parallel to isolation valve 46. The pressure control valve 54 is primarily to restore pressure in the line during each test in the event the isolation valve produces a substantial pressure change during opening and closing because of its size. This valve 54 can also be operated to bleed off pressure at a controlled rate when the pump is not in operation to check the operation of the leak detection system. This arrangement in this operation simply by-passes or bleeds off the pressure back to the pump side of the isolation valve when the pump is not operating so that it can be relieved by the system relief valve. Thus, this pressure control valve controls the pressure within the range above the pressure relieve valve of the pump.

A further modification is also provided wherein bypass leak simulation valve 58 is placed in line 60 venting from a position between the isolation valve and the dispenser valve back to the storage tank. This is a preferred arrangement for leak simulation. The system is preferably provided with both a pressure control valve and a leak simulation valve if desired.

The leak detection system of the present invention can be operated in a number of different ways including a pressure decay mode and an incremental pressure mode. In the pressure decay mode, the pipeline is brought up to operating pressure by operation of the submersible pump, such as when a customer is dispensing fuel. When the customer is through dispensing, a shut-off valve is closed and the submersible pump may be either turned off or left on as a pressure source. The isolation valve is closed to isolate the submersible pump from the pipeline and the pressure measurement device monitors the changes in pressure in the pipeline such as ±0.1 psi. The pressure control valve may or may not be used to bring the pipeline back up to pressure for repetitive pressure decay cycles, depending on the duration of each test cycle and the time between each test cycle. Pressure changes in the pipeline are indicative of the volume change of the fluid within the pipeline. The controller converts these changes within the pipeline to a fluid flowrate or leak rate and displays it on display 52.

When the internal volume of the pipeline and compressibility of fluid are known, a change in pressure can be equated to a volume change in the pipeline. This volume is then converted through controller 50 to a leak rate. Multiple test cycles may be run to verify the previous data or to determine the presence of volume changes due to other than leak rate, such as thermal effects, compressibility of trapped vapor within the pipeline and the compressibility of the pipeline itself. The present system eliminates the prior art problems of a leaking check valve and operates at an elevated pressure thereby minimizing the effects of compressibility depending upon the range of pressure change the pipeline itself undergoes during a leak test.

Figure 3:
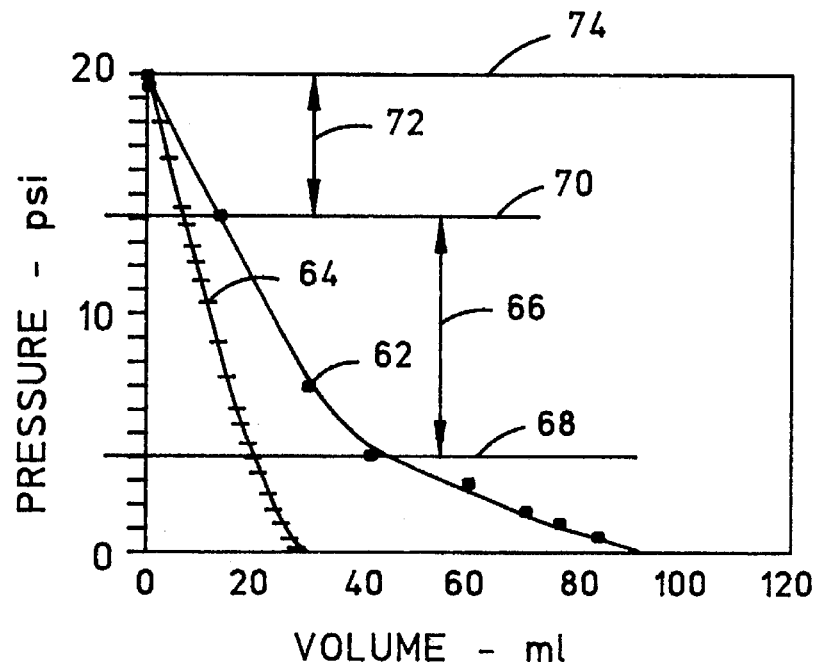
FIG. 3 is a diagram plotting pressure versus volume for a pipeline with vapor and a pipeline without vapor, showing comparison within linear and non-linear regions.

Referring to FIG. 3, this is a diagram plotting the pressure in psi vertically versus volume horizontally for a pipeline with vapor and a pipeline without vapor. The pipeline with vapor is represented by line 62 and the line without vapor by line 64. The diagram also illustrates a non-linear region 66 between pressure levels 68 at about 4 psi and 70 at 15 psi and a linear region 72 between pressure levels 70 and 74. As can be seen, the change in volume for a given change in pressure is greater in the pipeline with vapor than in the pipeline without vapor. Additionally, it can be seen that in the linear region above 15 psi very small changes in volume occur with changes in pressure. This invention operates in this linear region above 15 psi indicating an advantage of the present system. It will be clear to a person skilled in this art that pressure versus volume measurements are much more accurate and predictable, leading to repeatable results, when operating in the linear region of this curve.

Figure 4:
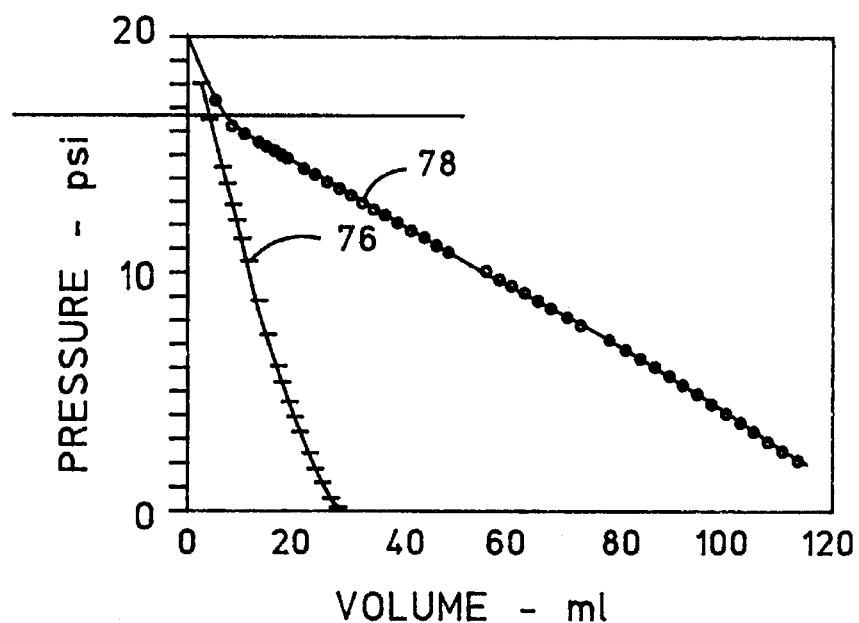
FIG. 4 is a diagram like FIG. 3 showing a plot of pressure versus volume for a steel pipeline and a steel pipeline with a compressible device.

Referring now to FIG. 4, a diagram similar to that of FIG. 3, there is shown a plot of pressure versus volume for a relatively incompressible steel pipeline 76 and a steel pipeline 78 having a significant compressibility characteristic. Again, with compressibility a much greater change in volume is provided with small incremental changes in pressure. Also, the change is much less in the generally linear region above about 15 psi, further illustrating the advantages of the present system for the reasons set out above in the FIG. 3 discussion. In effect, at elevated pressures as shown, the compressibility factors of vapor and pipeline modules of elasticity are all but eliminated from any leak rate determination because the relevant pressure/volume relationships arc then linear. Another factor reducing inaccuracies is that very small increments of pressure change, for example, 0.1 psi. Are employed in this system, so that only a tiny portion of the pressure/volume curve is relevant for any test cycle.

Figure 5:
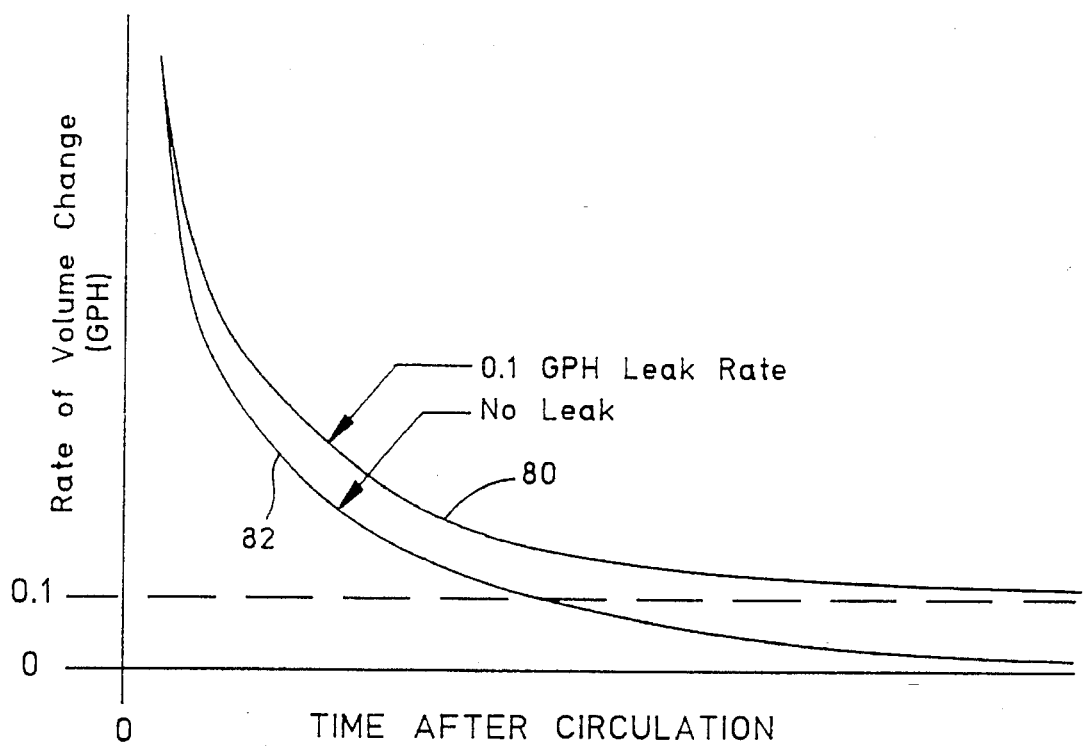
FIG. 5 is a diagram plotting rate of volume change versus time after flow for a thermal noise decay for a 0.1 gallon per hour leak rate and no leak rate.

FIG. 5 is a diagram illustrating a rate of change of volume over time for a system having a 1/10 gallon per hour leak rate 80 and a system having no leak 82, all due to thermal noise decay. These can be plotted for the system, and the controller or cpu programmed such that the system parameters are taken into consideration in the calculation of a leak rate.

Figure 6:
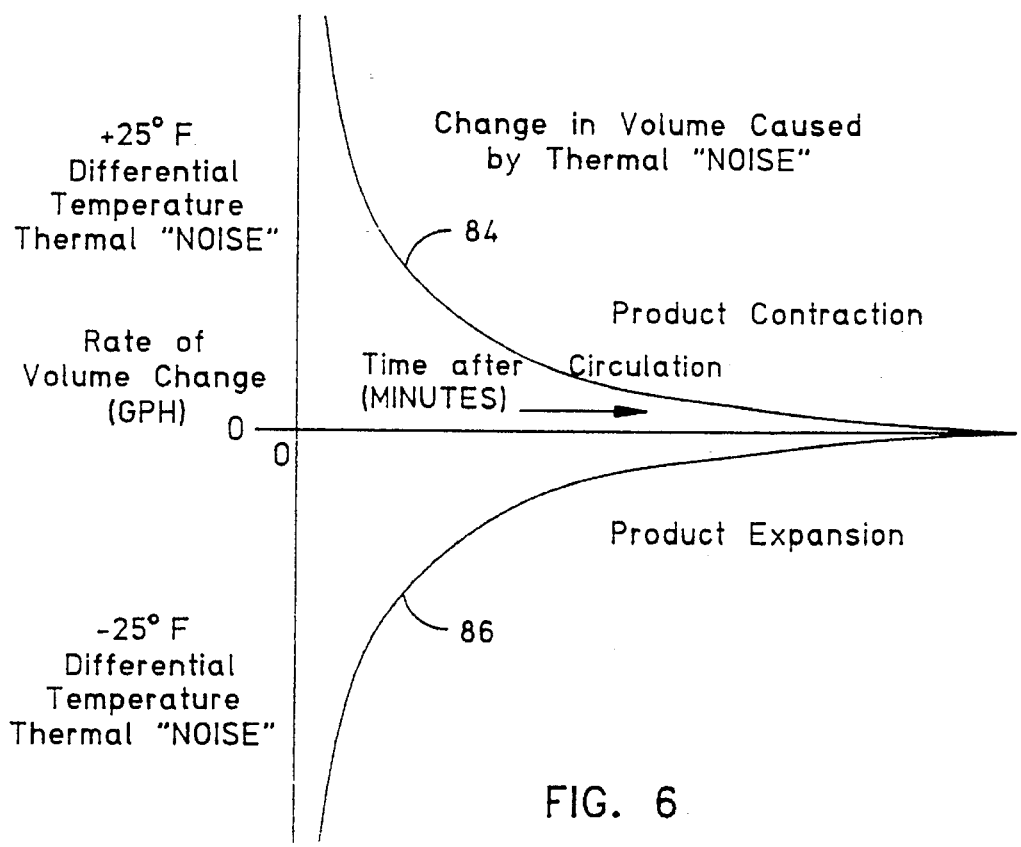
FIG. 6 is a diagram plotting a rate of volume change over a period of time for positive and negative 25 degree Fahrenheit differentials.

The difference in temperature between the fluid within the pipeline and the surrounding soil, which may reach 25° F., causes the fluid in the pipeline to attempt to reach equilibrium with the surrounding soil. These fluid temperature changes cause the fluid to expand or contract, resulting in a volume change within the closed system of the pipeline. This is illustrated in FIGS. 5 and 6. If FIG. 6, the horizontal zero rate of volume change represents the fluid temperature equal to the temperature of the surrounding soil. If the fluid is as much as 25° F. higher than the soil temperature, the fluid temperature will drop and the fluid will contract, as represented by curve 84. On the other hand, curve 86 represents increasing fluid temperature and product expansion when the fluid temperature is initially less than that of the surrounding soil.

Whether or not a leak is present, the leak detection system must be capable of determining the presence of thermal effects in order to prevent a false leak signal due to product contraction, or to prevent a real leak from being hidden by product expansion which may be greater than the leak rate to be measured.

Since the thermal conditions are caused by the circulation or flow of fluid of one temperature through the pipeline which is located in soil of another temperature, it can be seen that the greatest effects of the temperature will be present at the instant circulation is stopped. A test protocol can be devised and appropriate parameters introduced into the controller of the system to account for thermal noise during the leak detection determination.

Figure 7:
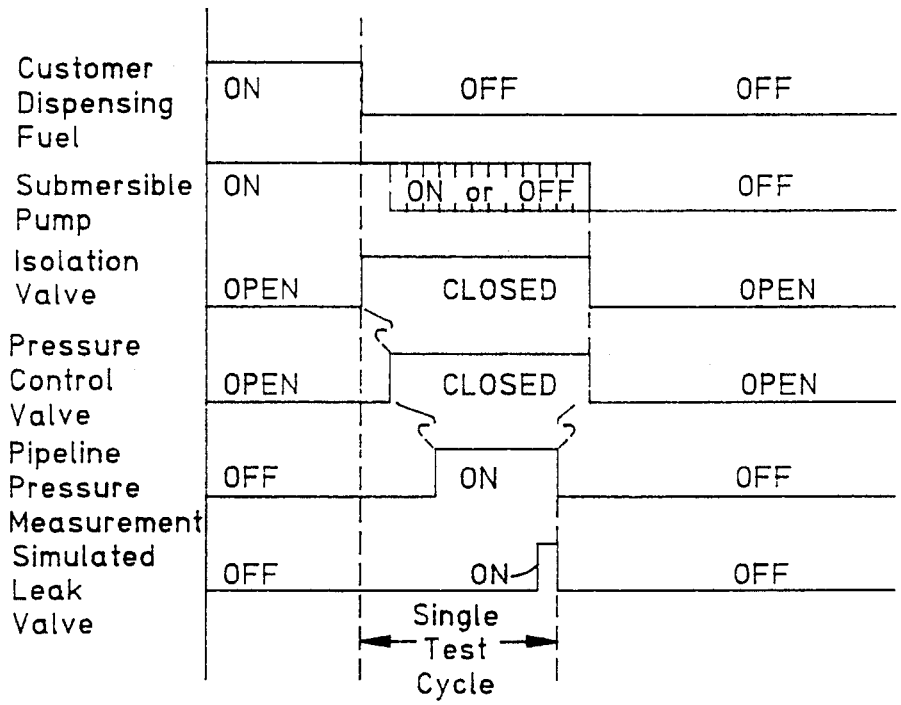
FIG. 7 is a diagram illustrating conditions of various components of the system during a pressure decay test cycle or mode.

Referring now to FIG. 7, the conditions of the various components of the system are illustrated for a pressure decay mode of testing. In this mode, the submersible pump is used to pressurize the pipeline and then turned off or left running as a pressure source. The isolation valve is then closed to isolate the pump from the pipeline. The pressure measurement monitors any pressure changes, for example, about ±0.1 psi. Any pressure change in the pipeline is indicative of volume change of fluid in the pipeline. The volume changes can be convened into a leak rate and displayed. Multiple test cycles may be run to either verify the previous data or determine the presence of volume changes due to thermal or other effects.

As each incremental pressure change is measured, the pressure control valve may or may not be opened to allow the pressure within the pipe to change using the pressure supplied by the submersible pump depending on the type of leak detection test being performed.

Figure 8:
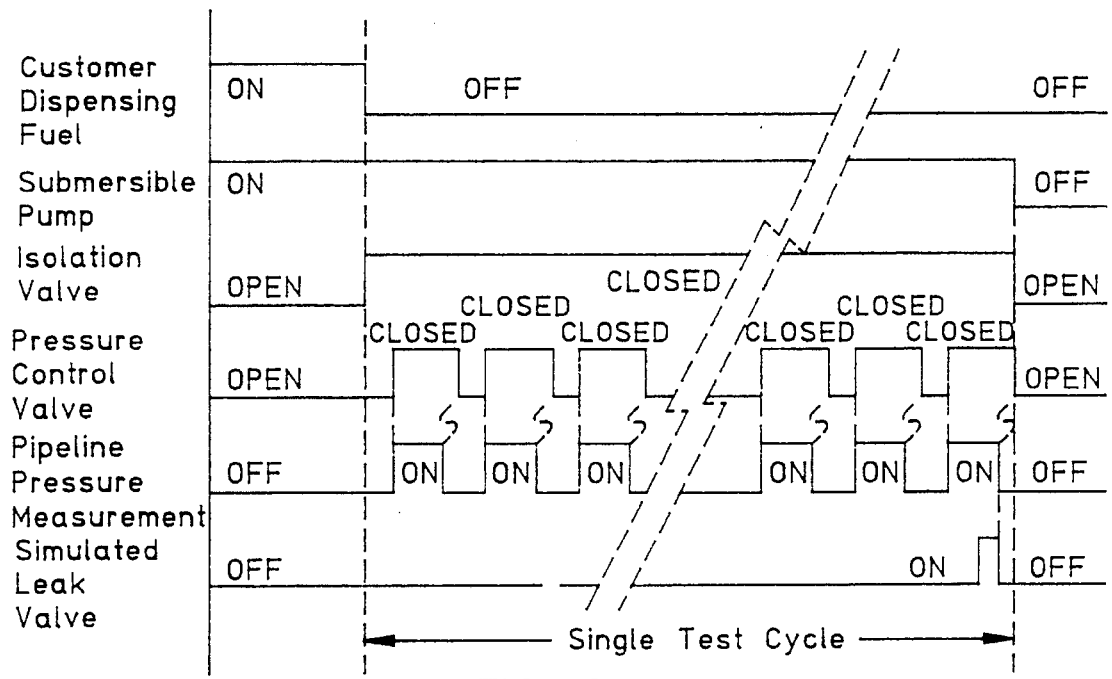
FIG. 8 is another diagram illustrating conditions of various components of the system during an incremental test cycle or mode.

Referring to FIG. 8, a diagram illustrating the operation of the components of the system during an incremental pressure mode of testing is illustrated. In this mode, the submersible pump is used to pressurize the pipeline and then stays running as a constant pressure source. The isolation valve is then closed to isolate the pump from the pipeline. The pressure measurement is taken for incremental changes of ±0.1 psi or less. As each incremental pressure change is measured, the pressure control valve may or may not be opened to allow the pressure within the pipe to change using the pressure supplied by the submersible pump, depending on the type of leak detection test being performed. The controller monitors the pressure measurement for each incremental pressure change within the pipeline. The magnitude of the incremental changes may be varied depending on the type of testing and the size of leak which is to be detected and the size of the pipeline.

This approach will allow larger leaks to be found more quickly, while smaller leaks would be found over an extended period of time. It would also allow the same size leak to be detected more quickly in a small pipeline than in a large pipeline due to the volume dependencies of the pressure/volume relationship. In the industry a small pipeline is a 200 ft.×2 inch diameter pipeline of about 33 gallon capacity. A large pipeline is about 800 ft. ×3 inch with about 350 gallon capacity.

The ability to determine the gain and loss of fluid within the pipeline could also be used to determine the presence of signal noise sources, such as thermal effects, trapped vapor and pipeline compressibility. The size and direction of the incremental pressure changes, number of changes per period of time, or time for each pressure change and the volume of the fluid contained within the piping are all taken into consideration as parameters in determining the presence of a leak within a pipeline. With a fixed volume pipeline of any size and a preset incremental pressure change, the number of pressure change increments over a given period of time can be directly equated to a loss of a specific volume of fluid within the pipeline and then converted into a leak. Also, if a fixed or variable incremental pressure is used and the rate of pressure change is measured, a volume change such as a leak rate within the pipeline can be determined. These application examples show the many different variables which can be used to optimize the use of this apparatus as a leak detection device.

Figure 9:
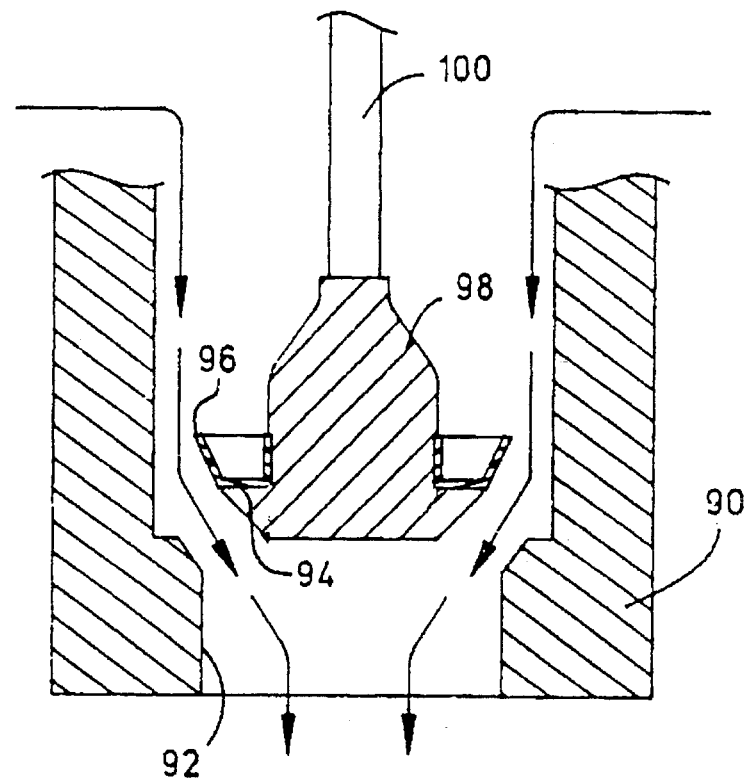
FIG. 9 is a detailed sectional view of an isolation valve in the open position.
Figure 10:
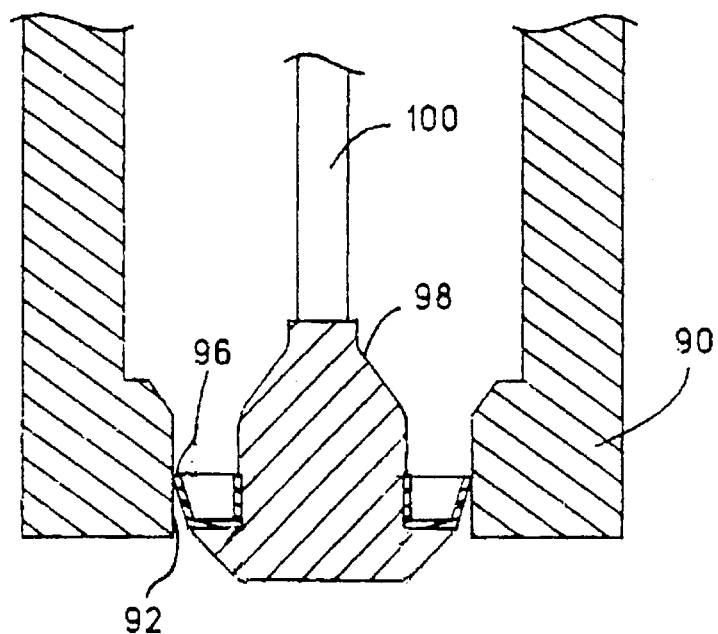
FIG. 10 is a view like FIG. 9 showing the valve closed.

Referring to FIGS. 9 and 10, a detailed portion of a suitable isolation valve is illustrated. The valve comprises a housing 90 having an inlet and a flow passage communicating with an outlet. A sealing surface 92 is disposed in the passage between the inlet and the outlet. A C-cup wiper seal 94 of a suitable hard material has a sharp sealing edge 96 which engage and wipes sealing starface 92 as it moves into and out of the closed position. The wiper seal is made of a suitable polymer material such as that sold under the trademark TEFLON. The TEFLON polymer seal is preferably graphite impregnated. The seal material is sufficiently hard that grains of sand and the like will not become embedded into it.

The seal member is mounted on a plunger 98 mounted on a plunger guide stem 100. The plunger may be operated by any number of mechanisms such as pressure operated diaphragm or piston or by an electrically operated solenoid. The plunger may also be spring operated to bias it to either one of the open positions of FIG. 9 or the closed position of FIG. 10.

While the invention has been illustrated and described by means of specific embodiments, it is to be understood that numerous changes and modifications may be made therein without departing from the spirit and scope of the invention as defined in the appended claims.

What is claimed is:

1. An apparatus for detecting leaks in a pipeline in a liquid dispensing system, comprising:

a tank containing a liquid;

dispensing valve means disposed remote from said tank:

a pipeline connected between said storage tank and said dispenser valve means;

a pump coupled to said pipeline for supplying liquid to said pipeline at an elevated pressure, the elevated pressure being a pressure at which the pressure/volume relationship in said pipeline is substantially linear:

an isolation valve in said pipeline between said pump and said dispenser valve for selectively isolating the segment of said pipeline between said isolation valve and said dispenser valve at the elevated pressure:

pressure sensing means in said pipeline segment for detecting pressure changes in the elevated pressure of the liquid in said pipeline segment: and control means having calculation and timing functions, the internal volume of said pipeline segment being known and being stored in memory in said control means, said isolation valve and said pressure sensing means being coupled to said control means, said control means being configured to compute a volume of liquid leaking from said pipeline segment from a predetermined incremental pressure change sensed by said pressure sensing means and the known internal volume in said pipeline segment.

2. The apparatus recited in claim 1, said control means being further configured to calculate leak rate in said pipeline segment by applying the computed volume of liquid leaking from said pipeline to the time necessary for that volume change to have occurred.

3. The apparatus according to claim 1, wherein said isolation valve includes a cup-shaped hardened wiper seal having an annular edge at the open end which wipes the sealing surface of said valve as it moves from the open to the closed position and as it moves from the closed to the open position, thereby eliminating contaminants between said wiper seal and said sealing surface and ensuring a positive seal.

4. The apparatus according to claim 3, and further comprising leak simulation means for verifying operation of said apparatus.

5. The apparatus according to claim 1, and further comprising leak simulation means for verifying operation of said apparatus.

6. The apparatus according to claim 5, wherein said leak simulation means comprises a fluid line connected to said pipeline between said isolation valve and said dispenser valve and to said tank, and a leak simulation valve in said fluid line.

7. The apparatus according to claim 1, wherein said apparatus further comprises selectively operable means for by-passing said isolation valve.

8. The apparatus according to claim 7, wherein said means for by-passing said isolation valve comprises a fluid line connected on opposite sides of said isolation valve to said pipeline, and a pressure control valve in said fluid line.

9. A method for detecting leaks in a pipeline in a liquid dispensing system, the pipeline being connected between a liquid storage tank and a dispenser valve, a pump connected for supplying liquid trader an elevated pressure to the pipeline between the pump and the dispenser valve, the method comprising the steps of:

providing a selectively actuable isolation valve between the pump and the dispenser valve to selectively isolate a pipeline segment, the internal volume of the pipeline of the segment being known:

providing a pressure sensing means in the pipeline segment;

providing a control means having calculation and timing functions, to which control means the isolation valve and pressure sensing means are coupled;

closing the dispenser valve:

energizing the pump for supplying liquid to the pipeline at a pressure so elevated that the pressure/volume relationship in the pipeline is substantially linear:

closing the isolation valve to isolate the pipeline segment with fluid therein at the elevated pressure:

detecting pressure changes of the fluid in the pipeline segment by means of the pressure sensing means:

generating a signal in the pressure sensing means which is indicative of the pressure changes sensed:

coupling the pressure change signal to the control means; and computing from a predetermined incremental pressure change and the known internal pipeline segment volume a volume of liquid leaking from the pipeline segment.

10. The method recited in claim 9, and comprisingly further step of calculating leak rate in the pipeline segment by applying the previously computed volume of liquid leaking from the pipeline segment to the period of time in which the leak occurred.

11. The method according to claim 9, wherein said incremental pressure change is about +0.1 psi.

12. The method according to claim 11, wherein said step of ascertaining a volume of liquid includes the step of:

from the known internal volume of the pipeline between the isolation valve and the dispenser valve and the known compressibility of the liquid in the pipeline converting a pressure change in said pipeline into a value indicative of a volume of liquid.

13. The method according to claim 9, wherein said predetermined delivery pressure is above about 15 psi.

14. The method according to claim 9, wherein said step of ascertaining a volume of liquid includes the step of:

from the known internal volume of the pipeline between the isolation valve and the dispenser valve and the known compressibility of the liquid and the pipeline, converting a pressure change in said pipeline into a value indicative of a change in volume of liquid.

15. The method according to claim 14, wherein said incremental pressure change is about +0.1 psi; and wherein said predetermined delivery pressure is above about 15 psi.

16. The method according to claim 14, wherein said incremental pressure change is about +0.1 psi.

17. The method according to claim 16, wherein said predetermined delivery pressure is above about 15 psi.

* * * * *